Figure 1:
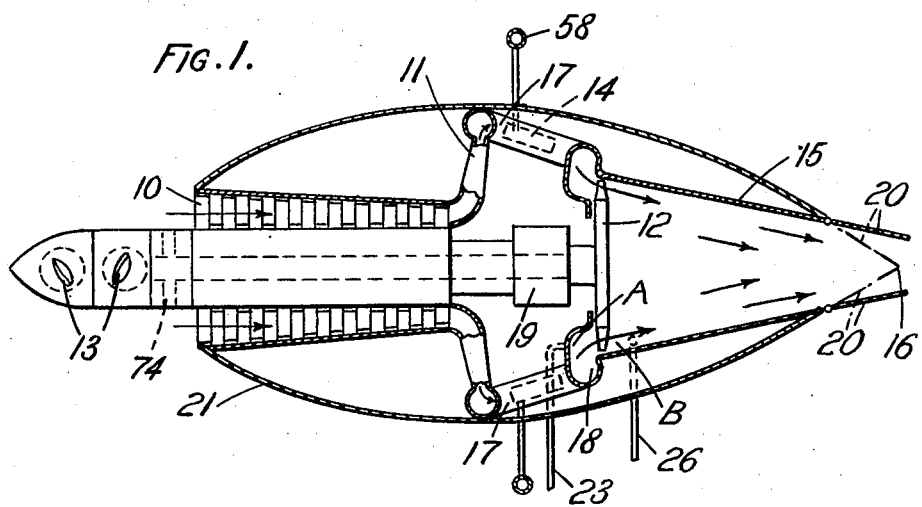

June 9, 1953   P. FORTESCUE   2,641,324
REGULATING MEANS FOR GAS TURBINE INSTALLATIONS
Filed Aug. 2, 1944   4 Sheets-Sheet 1

INVENTOR
PETER FORTESCUE
by Wilkinson Mawhinney
Attorneys

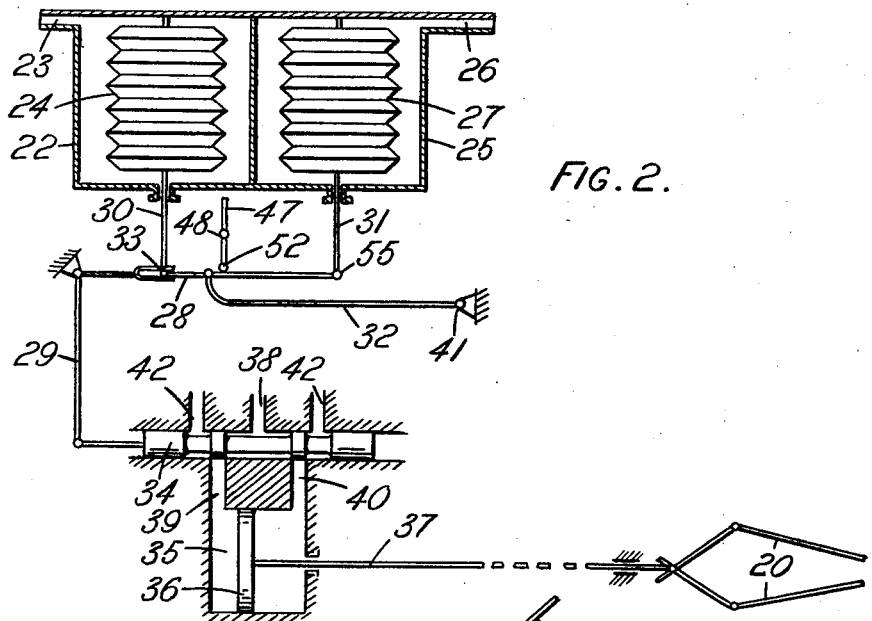
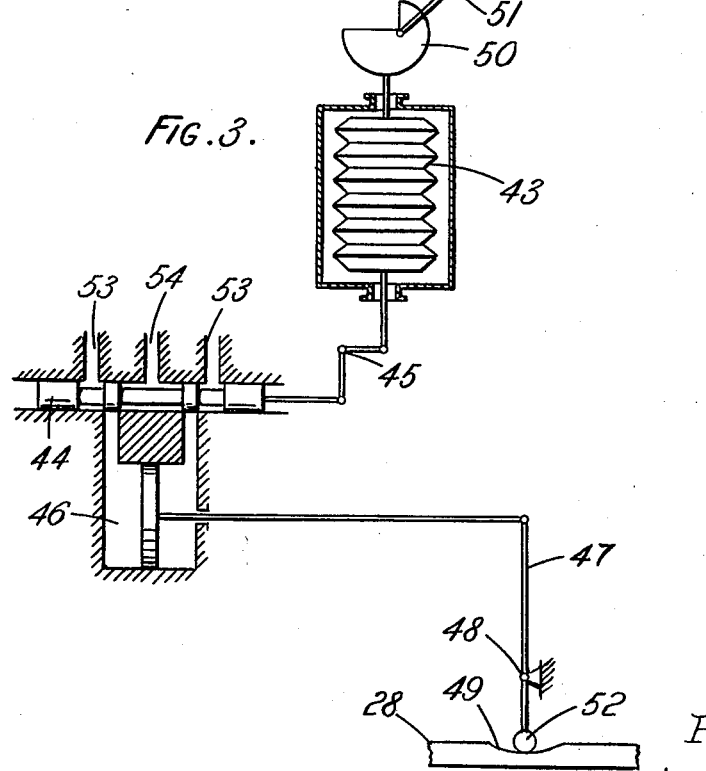

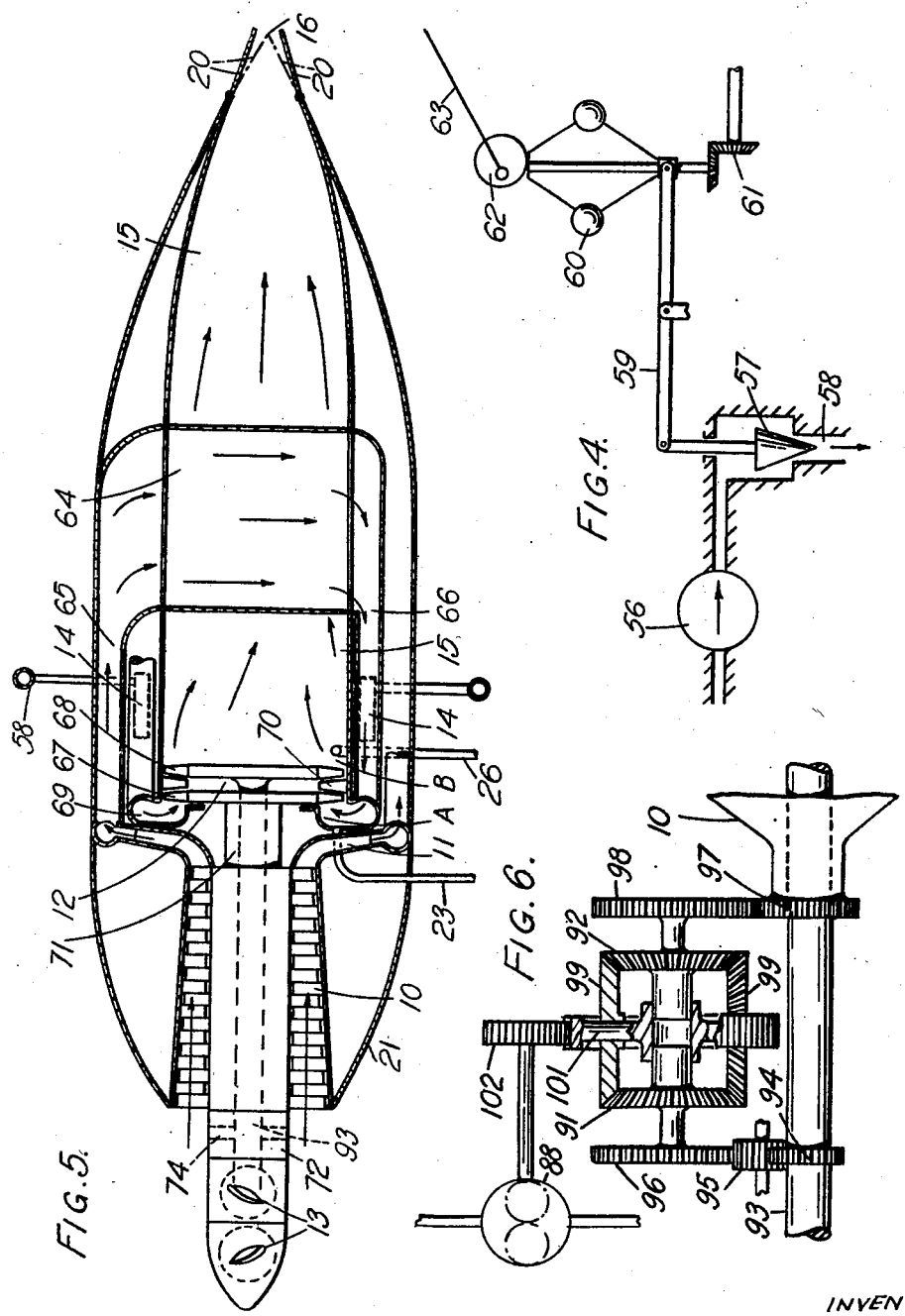

June 9, 1953     P. FORTESCUE     2,641,324
REGULATING MEANS FOR GAS TURBINE INSTALLATIONS
Filed Aug. 2, 1944     4 Sheets-Sheet 4
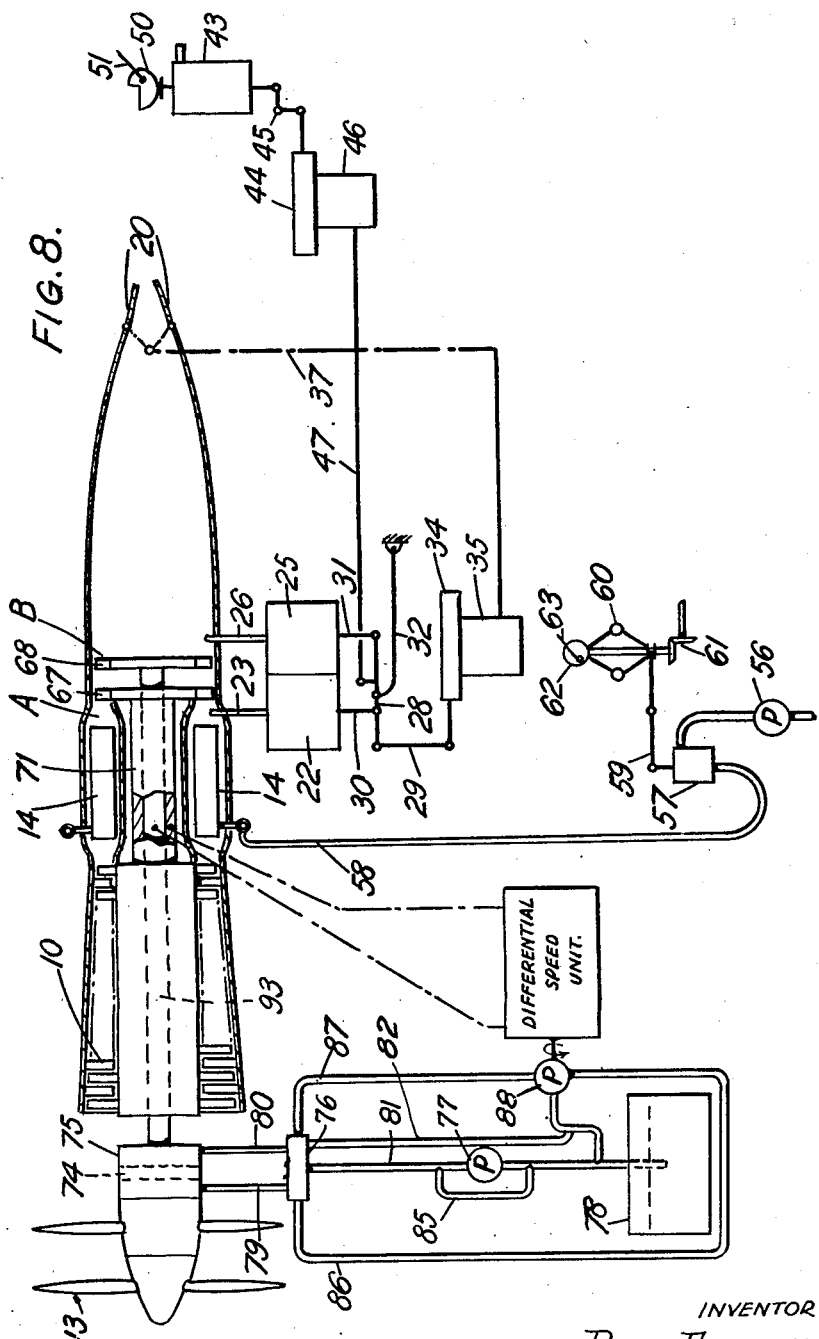

Patented June 9, 1953

2,641,324

UNITED STATES PATENT OFFICE 2,641,324

REGULATING MEANS FOR GAS TURBINE INSTALLATIONS

Peter Fortescue, Bristol, England, assignor to The Bristol Aeroplane Company Limited, Bristol, England, a British company Application August 2, 1944, Serial No. 547,759
In Great Britain February 19, 1943

Section 1, Public Law 690, August 8, 1946
Patent expires February 19, 1963

13 Claims. (Cl. 170—135.71)

This invention concerns regulating means for power-plants of the kind in which part of the power obtained from an internal combustion turbine is used to drive a compressor forming a member of said power-plant and the remainder of the power is used externally of the power-plant.

Whilst the invention is generally concerned with means for regulating power-plants as above set forth, it has particular reference to means for regulating such power-plants when installed in an aircraft.

It is a characteristic of power-plants of the kind referred to that variations in the operating conditions thereof for example, total power output required, and in the case of aircraft temperature and pressure variations with altitude necessitate adjustments to be made to the power-plant-controls to correct for said variations, since otherwise the efficiency of the plant may be impaired. When the power-plant is installed in an aircraft in which the operating conditions rapidly change and the pilot may be preoccupied with other matters, the power-plant is especially liable to inefficient operation. It is desirable therefore that the operator be relieved of the necessity of attending to those controls the adjustment of which ensures that the power-plant functions at a high efficiency, by performing said adjustments automatically. Moreover by performing certain of the control operations of the power plant automatically, the number of controls to which the operator has to attend is reduced.

It is an object of the present invention to provide means for automatically performing certain of the control operations of power-plants of the kind referred to.

According to the present invention means is provided automatically to regulate a power-plant of the kind referred to so that a substantially constant ratio is maintained between the inlet and outlet gas pressures of said turbine.

By the provision of said means it is ensured that within the range of operation for which the power-plant has been designed, there exists a substantially constant expansion ratio through the turbine and that as a result a good turbine efficiency is obtained throughout said range of operation.

Moreover when the pressure relationship referred to is maintained, it is found that a direct connection exists between the speed of rotation of the turbine and the temperature of the gases entering the turbine. Advantage is taken of this to provide, according to another feature of the invention, further regulating means for a power plant of the kind referred to, said means being associated with the means for maintaining a substantially constant ratio between the inlet and outlet gas pressures of the turbine and being adapted to regulate the rate of fuel-supply to said turbine as a function of its speed.

Preferably said fuel-supply means comprises a valve which regulates the rate of supply of fuel to said turbine, a speed-responsive device driven by the turbine, said valve being controlled by said speed-responsive device, and a control which selects the datum setting of the speed-responsive device whereby the quantity of fuel passing to the turbine maintains a selected speed, variations in the latter being rectified by the speed-responsive device adjusting the fuel valve.

A power-plant of the kind referred to may be provided with an internal combustion turbine having a pair of independent rotors through which the products of combustion successively pass, the arrangement being that one of said rotors is adapted to drive the compressor and the other is adapted to provide power for use externally of said power-plant. When an internal combustion turbine of this construction is provided in a power-plant of the kind set forth it is desirable to maintain a preselected speed relationship between the two rotors of said turbine since in this way it is possible to ensure that the power-output turbine operates at or near its optimum efficiency.

According to the present invention therefore a power-plant of the kind aforesaid which incorporates an internal combustion turbine having a pair of independent rotors is adapted to be regulated by means which automatically maintains a substantially constant ratio between the speeds of the two rotors of the turbine.

It is to be understood that in a power-plant of the kind referred to, in which an internal combustion turbine is provided with a pair of independent rotors, said speed- and pressure-regulating means may be provided in combination.

To this end, according to another aspect of the invention, means is provided automatically to regulate a power-plant of the kind set forth in which the internal combustion turbine has a pair of independent rotors, said means being adapted to maintain automatically and simultaneously a substantially constant ratio between the speeds of the pair of rotors and between the inlet and outlet gas pressures of said turbine.

Figure 7:
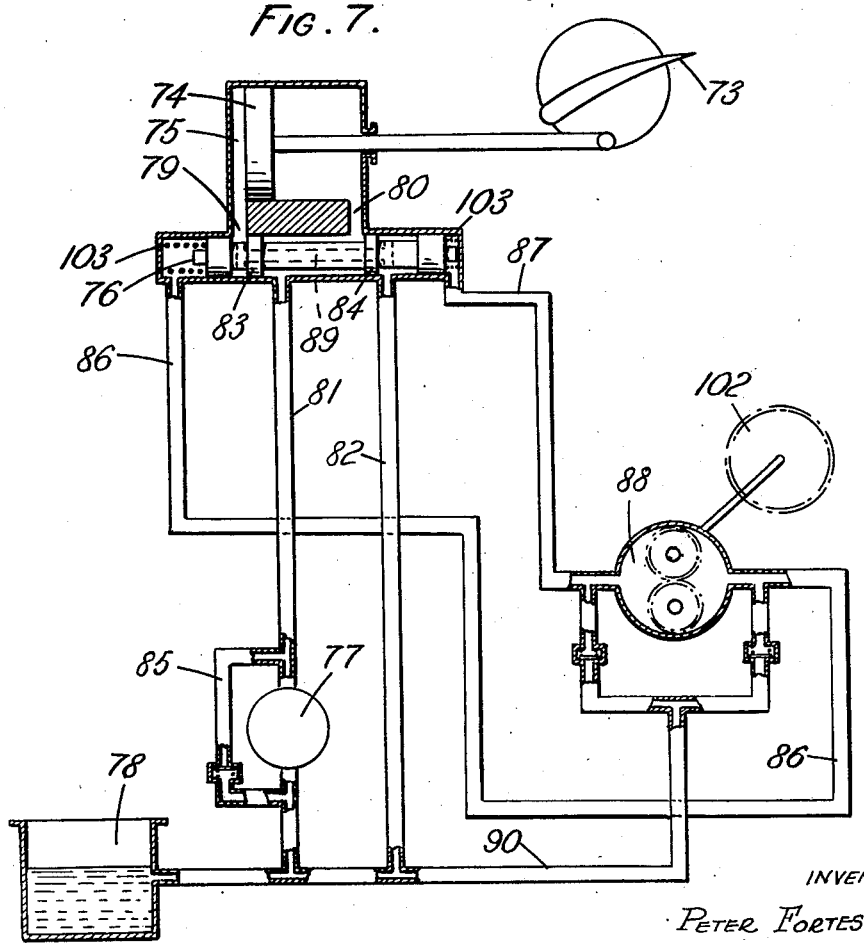

A specific embodiment of the various means which are provided according to the present invention to regulate a power-plant of the kind referred to will now be described with reference to the accompanying drawings of which:

Figure 1 is a diagrammatic illustration of a power-plant of the kind set forth, adapted for installation in an aircraft, Figure 2 is a schematic drawing of a regulating means which is capable of automatically maintaining the power-plant shown in Figure 1 at a substantially constant ratio between the inlet and outlet gas-pressures of the turbine, Figure 3 is a diagrammatic illustration of means for varying the datum value of the ratio of the gas-pressures, Figure 4 is a schematic drawing of a mechanism which, when associated with the regulating means shown in Figure 2, enables the speed of the turbine to be varied by varying the quantity of fuel passing to the turbine, Figure 5 is a diagrammatic illustration of another form which a power-plant of the kind referred to may take, the turbine being provided with a pair of independent rotors one of which drives the compressor, and the other drives the airscrews of an aircraft in which the plant is installed, Figure 6 is a schematic drawing showing means for detecting variations in the ratio of the speeds of the pair of rotors of the turbine which forms a member of the power-plant shown in Figure 5, and Figure 7 is a schematic drawing of mechanism which is brought into operation by the means shown in Figure 6 in order to maintain the speed-ratio of the rotors at a preselected constant value.

Figure 8 is a diagrammatic representation of a gas turbine engine incorporating the pressure and speed controls in accordance with this invention.

Referring to Figure 1 of the accompanying drawings: the power-plant comprises a pair of air compressors 10, 11, a turbine 12 which drives the compressors 10, 11 and the variable-pitch airscrews 13, a plurality of combustion chambers 14 through which the air from the compressor passes and in which fuel is burnt, and a duct 15 through which the exhaust gases from the turbine pass and from which they are discharged at 16 in a direction opposite to the movement of the aircraft. The compressor 10 is of the axial-flow type and is placed in series with the centrifugal type of compressor 11 so as to discharge thereinto. The air from the compressor 11 passes to the turbine 12 by a series of ducts 17 each of which carries one of the combustion chambers 14.

To reduce the overall diameter of the power-plant to a minimum, the components are placed, as far as is practicable, one behind the other. Thus as shown in Figure 1 the compressor 10, 11 is disposed immediately behind the airscrews 13, the gas-turbine 12 is placed behind the compressor, the duct 15 extends behind the turbine 12 from the discharge side of the turbine-rotor to the discharge nozzle at 16. As shown in Figure 1 the diametral dimensions of the duct 15 and gas-turbine 12 are less than those of the compressor 11 and advantage is taken of this to envelop the installation as a whole in a streamlined housing 21 whose greatest diameter is that of the compressor 11.

The products of combustion pass from each of the ducts 17 to an annular nozzle-box 18, through the turbine 12 and into the duct 15.

The turbine 12 drives the compressor 10, 11 and the airscrews 13, each through suitable reduction gearing indicated by the reference 19.

It will be appreciated that the exhaust gases leaving the duct 15 provide a propulsive thrust to the aircraft. The area through which the discharge gases pass is varied by adjusting the position of a pair of pivotal flaps 20. Adjustment of the discharge throat area varies the power provided by the thrust of the discharging gases and therefore by the airscrews. When the area is small, the thrust of the exhaust gases will be higher (and the thrust from the airscrews correspondingly lower) than when the area is increased.

The present invention provides a regulator means for the power-plant described which will automatically maintain the gas-pressures at the inlet point A to the turbine and at the outlet point B therefrom at a substantially constant ratio.

The means for maintaining the said pressure relationship referred to will now be described with reference to Figure 2.

The inlet pressure to the turbines at the point A (see Figure 1) is applied to chamber 22 by a pipe 23, so that variations in said pressure produce expansions or contractions of a stack of evacuated capsules 24 housed within the chamber. Similarly the outlet pressure from the turbine 12 at the point B is applied to a chamber 25 by a pipe 26, so that variations in said pressure produce expansions or contractions of a stack of evacuated capsules 27 located within chamber 25. The expansions and contractions of the capsules 24, 27 are respectively transmitted to a beam 28 by the rods 30 and 31. The beam 28 is supported by a link 32 which is freely mounted for pivotal movement at 41. The capsules 24, 27 and beam 28 are assembled so that the capsules exert a force at the ends of the beam which maintains it at all times in contact with a roller 52 which constitutes a fulcrum point for said beam. A bell-crank lever 29 is provided, one arm of which is forked to engage a pin 33 carried by rod 30, whilst the other arm engages the servo-valve 34 of a servomotor 35. The ram 36 of the motor 35 is connected by a linkage, generally indicated at 37, with the flaps 20 which are provided to vary the throat-area of the discharge nozzle at the rear end of the duct 15. The motor 35 is operated in known manner by adjusting the valve 34 endwise in one direction or the other to permit pressure fluid from the pipe 38 to pass by pipe 39 or 40 to either end of said motor, whilst the other end is connected to drain by pipes 42.

With the arrangement described, whilst the pressures at the points A and B are in their preselected relationship, the capsules 24 and 27 (which are subjected to these pressures) will maintain the beam 28 in such a position that the valve 34 is set through the agency of the bell-crank lever 29 to prevent pressure oil passing to the motor 35. Accordingly the flaps 20 are maintained in their existing position. When, however, the pressure at either point A or B varies so that the predetermined relationship is upset, it becomes necessary to adjust the flaps 20 to re-establish said relationship by adjusting the pressure at the point B. When the pressure-variation referred to occurs, it will be transmitted to the chamber 22 or 25, or to both said chambers, depending upon whether the pressure variation has occurred at the point A or the point B or at both said points. As a consequence of the change in the length of the capsules 24 and/or 27 which is produced by this pressure variation, the beam 28 is swung about a fulcrum 52 hereinafter described. The consequential movement of the bell-crank lever 29 displaces the servo-valve 34 from its normal position and enables the pressure fluid from the pipe 38 to pass to the motor 35. This pressure fluid acts on the ram 36 to adjust the setting of the flaps 20 and thereby change the pressure at the point B so as to re-establish the predetermined pressure relationship.

When this relationship has been re-established the evacuated capsules 24, 27 will reset the valve 34 to its normal position, in which pressure oil from pipe 38 is cut off from the motor 35.

It will be understood that the predetermined pressure relationship referred to may be upset by a change in the pressure at either or both points. Irrespective of the manner in which the pressure relationship is upset, the change or changes in pressure which result in the ratio of the pressures at A and B being changed, will be transmitted to the capsule stacks in the chambers 22, 25 and this produces a control effect through the agency of the servo-valve 34 and the servo-motor 35. In the event that the absolute value of the pressures at A and B changes but the ratio remains unaltered, then no control effect will be produced.

It is to be noted that although the beam 28 is supported by lever 32, the latter being pivotally mounted at 41, enables the beam freely to turn about the roller 52. The function of the lever 32 is to prevent lateral movement of the beam 28.

It is anticipated that in certain circumstances it may be necessary to vary the datum value of the ratio of the pressures at the points A and B in order to ensure that the pivoted flaps 20 (which would otherwise gradually and continuously close the discharge nozzle with the temperature-decrease consequent on an increase in the operating altitude) are biased towards the open position, the amount of this bias being dependent upon the altitude. To this end the mechanism shown in Figure 3 is provided. This comprises a stack of barometric capsules 43 which are subjected to the pressure of the atmosphere, a servo-valve 44 which is connected with said capsule 43 by a linkage indicated at 45, a servo-motor 46 which is controlled by said valve 44 and a control lever 47 pivotally mounted at 48 and engaging with an arcuate face 49 formed on the beam 28. The datum setting of the barometric capsules 43 is varied by the cam 50 whose position is selected by a pilot's lever 51.

In order to ensure that the control effect produced by the motor 46 is sufficient exactly to satisfy the demand made by the capsules 43 and/or the cam 50, the servo-valve 44 is of the known type comprising a sleeve (not shown) which surrounds the valve and is provided with ports corresponding to those formed by the pipes 53, 54. The sleeve is slidable axially and is connected with the motor 46 so that when the latter is brought into operation it actuates both the lever 47 and the said sleeve simultaneously. This construction of "follow-up" mechanism is commonly used in association with servo-valves of the type shown in Figure 3, and for the sake of clarity it has not been shown in the drawings.

The free end of the lever 47 carries the roller 52 (see also Figure 2) which constitutes the fulcrum point above-mentioned of the beam 28. If therefore the arm 47 is angularly adjusted to one or other side of a central position the roller 52 will move over the surface 49 and as a consequence the ratio of the length of the beam 28 from the point 55 (see Figure 2) to the fulcrum point at 52, and from the point 33 to said fulcrum point, will be changed. Such changes in leverage necessitate corresponding changes taking place in the forces exerted by the capsules if the beam 28 is normally to assume a position in which the valve 44 closes the pipes 39, 40 leading to the motor 35.

When the lever 51 is moved to adjust the datum setting of the capsules 43 by the cam 50, the linkage 45 will adjust the servo-valve 44 to permit pressure fluid from the pipe 54 to pass to the motor 46 which thereupon adjusts the position of the arm 47 and hence the position of the roller 52. Similarly when the capsules 43 expand or contract with variations in the operating altitude of the installation, such movements will be transmitted by the linkage to the servo-valve as already explained, and as a consequence the position of the roller 52 will be adjusted. In either circumstance, the leverage of capsules 24, 27 is changed and as a consequence the ratio of the pressures at the points A and B is changed in a corresponding manner. In this way by varying the position of the roller 52 the ratio of the pressures at A and B may be varied as required.

When the ratio of the inlet and the outlet gas pressures at A and B is maintained constant in the manner above described there is a direct relationship between the speed of rotation and the temperature of the gases entering the turbine. This temperature depends upon the rate of fuel supply. The maximum permissible centrifugal stress in a turbine-rotor decreases with rise of temperature, and it is necessary to correlate the temperature and speed to ensure that a safe working stress is obtained under all working conditions. This is effected by a simple centrifugal governor driven by the turbine and operating on the fuel valve.

A specific embodiment of this form of speed-temperature control is shown in Figure 4 in which the fuel from the fuel pump 56 is passed through a metering valve 57 to a pipe 58 and thence to the combustion chambers 14. The metering valve is axially adjustable by a lever 59 which is under the control of a centrifugal governor 60. The latter is driven through gearing 61 from the turbine 12. The datum setting of the governor 60 is determined by a cam 62 the position of which is adjusted by lever 63.

The metering valve 57 is adjusted upon variations in the speed of the centrifugal governor 60 and hence of the speed of the turbine 12 which drives the governor. Thus if the turbine, which has been operating at a pre-selected speed, increases its speed, this speed-increase is transmitted to the centrifugal governor 60 and as a result the metering valve 57 is adjusted to reduce the quantity of fuel passing to the turbine. The speed of the latter is therefore reduced until it again operates at the pre-selected speed. Similarly if the speed of the turbine falls the centrifugal governor 60 adjusts the valve 57 to increase the quantity of fuel, thereby returning the turbine to its preselected speed value.

In order to vary the speed of the turbine 12 and hence its power output the lever 63 is adjusted to vary the datum setting of the centrifugal governor 60. This produces an adjustment of the metering valve 57 so as to select a quantity of fuel for the turbine operation such that said turbine rotates at the speed selected. When such a datum speed has been selected and obtained, the centrifugal governor will maintain the turbine at that speed value by adjusting the setting of the metering valve.

The power-plant shown in Figure 5 is of similar general construction to that of Figure 1. It comprises an axial-flow type of compressor 10, a centrifugal type of compressor 11 into which compressor 10 discharges, a turbine 12 which drives the compressors 10, 11 and the variable pitch airscrews 13, a plurality of combustion chambers 14 through which the air from the compressor passes and in which fuel is burnt, and a duct 15 through which the exhaust gases from the turbine pass to be discharged at 16. With a view to pre-heating the air which passes from the compressors 10, 11 to the combustion chambers 14, a heat-exchanger 64 is provided. The latter is disposed in the duct 15 so that the exhaust gases pass through the heat-exchanger as they flow from the turbine 12 to the discharge orifice at 16. The air from the compresor 11 passes to the heat-exchanger 16 by a series of ducts 65, whilst the heated air from the heat-exchanger passes to the turbine by a plurality of ducts 66 each of which carries one of the combustion chambers 14. The ducts 65, 66 lie around the periphery of the duct 15 which has smaller diametral dimensions than the compressor 11 due to the similarly smaller dimensions of the turbine 12 and heat-exchanger 64. In this way the ducts 65, 66 do not extend radially beyond the periphery of the compressor. The ducts 65, 66 are intercalated.

In order to provide a power-plant of greater flexibility in operation than the plant shown in Figure 1, the turbine 12 of the power-plant shown in Figure 5 is provided with a pair of independent rotors 67, 68. The products of combustion pass from the combustion chambers 14 to an annular nozzle box 69 and then in succession through rotor 67, nozzle box 70 (which is sandwiched between the two rotors) and the rotor 68. The rotor 67 is coupled to the compressors 10, 11 as at 71, driving it, if desired, through a reduction gearing. The rotor 68 drives the airscrews 13 through a suitable reduction gearing (not shown) located between the compressor 10 and said airscrews—for instance within housing 72.

The power-plant is enclosed in a streamlined housing 21.

The exhaust gases from the turbine which are discharged at 16 provide a propulsive thrust to the aircraft. The area of the orifice through which the gases at 16 pass is varied by adjusting the position of the pivotal flaps 20.

In a power-plant as described with reference to Figure 5 it is necessary to ensure that the speed of the rotor 68 is proportional to the velocity of the gases leaving the nozzle box 70 if said rotor is to operate in an efficient manner. It can be shown that this velocity is proportional to the speed of the compressor 10, 11 and hence of the rotor 67. As a consequence by maintaining automatically a constant speed ratio between the rotors 67, 68 the conditions for efficient operation of rotor 68 will be met. The pilot is therefore relieved of this duty. The mechanism which is provided to maintain said speed relationship is shown in Figures 6 and 7.

In Figure 7 a blade 73 of the airscrews 13 is shown as connected for pitch-variation to the ram 74 of a hydraulic motor 75. The admission and discharge of pressure oil to and from the motor 75 is regulated by a valve 76. The latter normally assumes a central position (as will be described hereinafter) in which pressure oil is prevented from passing to, or from, said motor. However, valve 76 is capable of axial movement to assume either of two positions in each of which the pressure oil is permitted to pass to the motor 75. In one such position the motor 75 will be brought into operation to move the airscrew blades to coarsen th pitch and in the other position the motor will move the blades to a finer pitch position. To effect these pitch-change movements a pump 77 draws oil from a reservoir 78 and passes it to the motor 75 by a pipe 81 and either pipe 79 or 80 depending upon the position which valve 76 assumes. The fluid discharged from the motor 75 passes by pipe 80 or 79 through the interior of the valve 76 and then by pipe 82 to the reservoir 78. These parts 76, 77, 78 and 88 are outside the hub 75 being suitably carried by plant structure and the drive to pump 88 is taken from the compressor 10 as hereinafter described.

Whilst the ratio of the speeds of the rotors 67, 68 is maintained constant the valve 76 assumes a central position in which the pipes 79 and 80 are closed respectively by the lands 83, 84 of the said valve. Under these conditions the pressure oil from pump 77 is incapable of passing to the motor 75 to effect any change in pitch. The oil delivered by pump 77 is then circulated around the branch pipe 85 and relief-valve.

When the speed-ratio between the rotors is upset, the speed of rotor 68 (which drives the airscrews 13) is automatically adjusted by changing the pitch of the airscrews so as to re-establish said ratio.

With this end in view the valve 76 is capable of being displaced axially one way or the other, thereby enabling the pressure-oil from pump 77 to pass to the motor 75 to effect the required pitch-change movement. For this purpose each end of the valve 76 is connected by a pipe 86, 87 with a gear-type pump 88. When the pump 88 delivers oil under pressure to the pipe 87 the valve 76 will be moved towards the left and the pump 77 will pass pressure oil to motor 75 by pipe 79. Consequently the ram 74 will be moved towards the right to effect a pitch-change movement in one sense thereby altering the speed of rotor 68 to re-establish the speed-ratio relationship between the rotors. Simultaneously oil passes from the other side of motor 75 to the reservoir 78 by pipes 80, 82. Similarly when pump 88 delivers pressure oil to pipe 86 valve 76 is moved to the right and assumes the position shown in Figure 7 in which oil under pressure from pump 77 passes by pipe 80 to the motor 75 and the ram 74 is moved towards the left to effect a pitch-change movement in the opposite sense. This has the effect of altering the speed of rotor 68 to re-establish the speed-ratio which is to be maintained. At the same time oil drains from motor 75 to reservoir 78 by pipe 79, passage 89, and pipe 82.

The suction side of pump 88 is connected with the reservoir 78 by pipe 90.

The pump 88 is capable of rotation both clockwise and anti-clockwise, the arrangement being that when it rotates in one direction it will deliver to pipe 86 and when it rotates in the opposite direction it will deliver to pipe 87. As will be appreciated of course whilst the pump is inoperative no delivery to the valve 76 takes place. The latter normally remains in a position in which the lands 83, 84 cover the pipes 79, 80, light springs 103 being provided at each end of valve 76 to locate the valve in said position whilst the pump 88 is inoperative.

The pump 88 is driven by the differential speed unit shown in Figure 6. This comprises a pair of co-axial bevel gears 91, 92 of which gear 91 is driven from the airscrew-shaft 93 through a train of gears 94, 95 and 96 whilst gear 92 is driven through gears 97, 98 from the compressor 10 and therefore primarily derive their drive from the two rotors 67, 68. Gears 91, 92 face each other and each meshes with a pair of planet bevel gears 99. The carrier 100 for the gears 99 is mounted for rotation (as at 101) about the common axis of the bevel gears 91, 92 and is connected through a suitable gear train indicated at 102 with the pump 88.

So long as a predetermined speed relationship is maintained between the turbine rotors 67 and 68 the bevel gears 91, 92 will be rotated at the same speed in opposite directions and accordingly the planet-carrier 100 will be maintained stationary. If the speed of either of the turbine rotors 67 and 68 assumes a value which upsets the predetermined speed relationship the co-axial gears 91, 92 rotate at different speeds and the planet carrier 100 will in consequence commence to rotate about support 101 thereby driving pump 88 through the agency of the gear train 102. As already mentioned when the pump 88 is driven by the differential speed unit shown in Figure 6 it will transmit pressure oil to the valve 76 by pipe 86 or 87 depending upon the direction of rotation of pump 88. The resulting adjustment to the valve 76 enables the pressure fluid from the pump 77 to pass to the motor 75 thereby altering the pitch of the airscrew blades 73. In consequence the speed of the airscrews 13 and turbine rotor 68 is altered to restore the speed relationship between the rotors 67, 68 which it is desired to maintain.

The speed-control mechanism described with reference to Figure 6 may be replaced by other forms of mechanism which are capable of detecting differences from a preselected value of the ratio between the speed of the turbine rotors 67, 68 and of re-establishing the pre-selected value upon a difference being detected. Thus an electric differential unit may be provided, which receives current from a pair of alternators, one being driven at a speed proportional to that of the rotor 67 and the other at the speed of the rotor 68. The differential unit is responsive to frequency differences which are produced when the speed of the airscrews or compressor alters and upsets the pre-selected value of speed ratio. The differential unit suitably adjusts the valve 76 thereby altering the pitch of the airscrews 13 to bring about a return of the preselected ratio of the speeds.

It will be appreciated that the power-plant described with reference to Figure 5 is capable of being regulated so as to maintain a constant ratio between the inlet and outlet gas pressures of the two-stage turbine 12. This pressure regulation is preferably performed in a similar manner to that described as being provided for the regulation of the power-plant of Figure 1. It is used, however, in association with the speed-ratio regulation which has been described as being provided for the regulation of the power-plant of Figure 5.

I claim:

1. A power plant comprising a gas turbine having a pair of independent rotors through which the working fluid passes in series, a combustion chamber for producing the working fluid for the gas turbine, an air compressor driven by one rotor of the gas turbine and supplying combustion air to said combustion chamber, power absorbing means external of the power plant driven by the other rotor of the gas turbine, means responsive to the speed of each rotor, and control means actuated by said speed responsive means automatically to maintain the ratio between said speeds substantially constant with variations in said speeds due to changes in the operating conditions of the power plant.

2. A power plant comprising a gas turbine having a pair of independent rotors through which working fluid passes in series, a combustion chamber for producing the working fluid for the gas turbine, an air compressor driven by one rotor of the gas turbine and supplying combustion air to said combustion chamber, power absorbing means external of the power plant driven by the other rotor of the gas turbine, means responsive to the pressure of the working fluid at the inlet to the turbine and at the outlet therefrom, control means actuated by said pressure responsive means automatically to maintain the ratio between said pressures substantially constant, means responsive to the speed of each rotor and control means actuated by said speed responsive means automatically to maintain the ratio between said speeds substantially constant.

3. A power plant comprising a gas turbine having a pair of independent rotors through which the working fluid passes in series, a combustion chamber for producing the working fluid for the gas turbine, an air compressor driven by one rotor of the gas turbine and supplying combustion air to said combustion chamber, power absorbing means external of the power plant driven by the other rotor of the gas turbine, means responsive to the speed of each rotor and control means actuated by said speed responsive means to vary the power absorbed by said means external of the power plant to maintain automatically the ratio between said speeds substantially constant with variations in said speeds due to changes in the operating conditions of the power plant.

4. A power plant for a propeller-driven aircraft comprising a gas turbine having a pair of independent rotors through which the working fluid passes in series, a combustion chamber for producing the working fluid for the gas turbine, an air compressor driven by one rotor of the gas turbine and supplying combustion air to said combustion chamber, a variable-pitch propeller driven by the other rotor of the turbine, means responsive to the speed of each rotor and control means actuated by said speed responsive means automatically to vary the pitch of the propeller blades to maintain the ratio between said speeds substantially constant with variations in said speeds due to changes in the operating conditions of the power plant.

5. A power plant for a propeller-driven aircraft comprising a gas turbine having a pair of independent rotors through which the working fluid passes in series, a combustion chamber for producing the working fluid for the gas turbine, an air compressor driven by one rotor of the gas turbine and supplying combustion air to said combustion chamber, a hydraulically operated variable-pitch propeller driven by the other rotor of the turbine, a differential speed unit one member of which is driven at the speed of one rotor and another member of which is driven at the speed of the other rotor, a hydraulic pump driven by the differential speed unit and valve means actuated by the pressure fluid delivered by said pump, said valve means regulating the admission and discharge of pressure fluid to and from the hydraulic pitch-change mechanism of the propeller.

6. A power plant comprising a gas turbine having a pair of independent rotors through which the working fluid passes in series, a combustion chamber for producing the working fluid for the gas turbine, an air compressor driven by one rotor of the gas turbine and supplying combustion air to said combustion chamber, power absorbing means external of the power plant driven by the other rotor of the gas turbine, a pressure responsive device subjected to the pressure of the working fluid at the inlet to the first turbine rotor, a further pressure responsive device subjected to the pressure of the working fluid at the outlet from the second turbine rotor, a beam to which each of said devices is coupled, a servo-valve actuated by said beam, a hydraulic servo-motor the admission and discharge of pressure fluid to and from which is regulated by said valve and means operated by said servo-motor for varying the area of an orifice through which the gases from said second turbine rotor are discharged.

7. A power plant comprising a gas turbine having a pair of independent rotors through which the working fluid passes in series, a combustion chamber for producing the working fluid for the gas turbine, an air compressor driven by one rotor of the gas turbine and supplying combustion air to said combustion chamber, power absorbing means external of the power plant driven by the other rotor of the gas turbine, a pressure responsive device subjected to the pressure of the working fluid at the inlet to the first turbine rotor, a further pressure responsive device subjected to the pressure of the working fluid at the outlet from the second turbine rotor, a beam to which each of said devices is coupled, a servo-valve actuated by said beam, a hydraulic servo-motor the admission and discharge of pressure fluid to and from which is regulated by said valve, means for varying the fulcrum point of the beam to vary the relative control effects of the pressure responsive devices on the beam and hence on the servo-valve and means operated by said servo-motor for varying the area of an orifice through which the gases from said second turbine rotor are discharged.

8. A power plant for an aircraft comprising a gas turbine having a pair of independent rotors through which the working fluid passes in series, a combustion chamber for producing the working fluid for the gas turbine, an air compressor driven by one rotor of the gas turbine and supplying combustion air to said combustion chamber, power absorbing means external of the power plant driven by the other rotor of the gas turbine, a pressure responsive device subjected to the pressure of the working fluid at the inlet to the first turbine rotor, a further pressure responsive device subjected to the pressure of the working fluid at the outlet from the second turbine rotor, a beam to which each of said devices is coupled, a servo-valve actuated by said beam, a hydraulic servo-motor the admission and discharge of pressure fluid to and from which is regulated by said valve, a barometric capsule connected with the fulcrum point of said beam automatically to vary the relative control effects of the pressure responsive devices with variations in the operating altitude of the aircraft, a manual control for varying the datum setting of said barometric capsule and means operated by said servo-motor for varying the area of an orifice through which the gases from said second turbine rotor are discharged.

9. A power plant comprising a gas turbine having a pair of independent rotors through which the working fluid passes in series, a combustion chamber for producing the working fluid for the gas turbine, an air compressor driven by one rotor of the gas turbine and supplying combustion air to said combustion chamber, power absorbing means external of the power plant driven by the other rotor of the gas turbine, means responsive to the pressure of the working fluid at the inlet to the first turbine rotor and at the outlet from the second turbine rotor, control means actuated by said pressure responsive means auomatically to maintain the ratio between said pressures substantially constant, a fuel-supply valve for regulating the quantity of fuel supplied to the combustion chamber and means responsive to the speed of one of the rotors of the turbine for adjusting said fuel-supply valve.

10. A power plant comprising a gas turbine having a pair of independent rotors through which working fluid passes in series, a combustion chamber for producing the working fluid for the gas turbine, an air compressor driven by one rotor of the gas turbine and supplying combustion air to said combustion chamber, power absorbing means external of the power plant driven by the other rotor of the gas turbine, means responsive to the pressure of the working fluid at the inlet to the turbine and at the outlet therefrom, control means actuated by said pressure responsive means automatically to maintain the ratio between said pressures substantially constant, means responsive to the speed of each rotor, control means actuated by said speed responsive means automatically to maintain the ratio between said speeds substantically constant, a fuel-supply valve for regulating the quantity of fuel supplied to the combustion chamber and means responsive to the speed of one of the rotors of the turbine for adjusting said fuel-supply valve.

11. A power plant as claimed in claim 9, wherein the speed responsive means is a flyweight governor driven by one of the rotors of the gas turbine, said governor being adjustable by a manual control to vary the datum speed of one of said gas turbine rotors.

12. A power plant comprising a gas turbine having a pair of independent rotors through which the working fluid passes in series, a combustion chamber for producing the working fluid for the gas turbine, an air-compressor driven by one rotor of the gas turbine and supplying combustion air to said combustion chamber, power absorbing means external of the power plant driven by the other rotor of the gas turbine, means responsive to the speed of each rotor and control means actuated by said speed responsive means automatically to maintain a predetermined relationship between said speeds.

13. A power plant comprising a gas turbine having a pair of independent rotors through which the working fluid passes in series, a combustion chamber for producing the working fluid for the gas turbine, an air compressor driven by one rotor of the gas turbine and supplying combustion air to said combustion chamber, power absorbing means external of the power plant driven by the other rotor of the gas turbine, means responsive to the speed of each rotor, control means actuated by said speed responsive means automatically to maintain the ratio between said speeds substantially constant with variations in said speeds due to changes in the operating conditions of the power plant and regulating means for selecting said ratio at will.

PETER FORTESCUE.

References Cited in the file of this patent

UNITED STATES PATENTS

| Number | Name | Date |
|---|---|---|
| Re. 23,198 | Anxionnaz | Feb. 21, 1950 |
| 872,377 | Samuelson | Dec. 3, 1907 |
| 993,982 | Halliwell | May 30, 1911 |
| 1,809,271 | Goddard | June 9, 1931 |
| 2,026,814 | Caldwell et al. | Jan. 7, 1936 |
| 2,050,349 | Lysholm et al. | Aug. 11, 1936 |
| 2,105,089 | Martin | Jan. 11, 1938 |
| 2,160,281 | Price | May 30, 1939 |
| 2,162,956 | Lysholm | June 20, 1939 |
| 2,173,913 | Morehouse | Sept. 26, 1939 |
| 2,236,841 | Waseige | Apr. 1, 1941 |
| 2,260,469 | Martin | Oct. 28, 1941 |
| 2,276,663 | Mercier | Mar. 17, 1942 |
| 2,280,835 | Lysholm | Apr. 28, 1942 |
| 2,286,908 | Goddard | June 16, 1942 |
| 2,292,288 | Pescara | Aug. 4, 1942 |
| 2,305,311 | Jendrassik | Dec. 15, 1942 |
| 2,306,953 | Jung | Dec. 29, 1942 |
| 2,356,557 | Anxionnaz | Aug. 22, 1944 |
| 2,358,815 | Lysholm | Sept. 26, 1944 |
| 2,360,130 | Heppner | Oct. 10, 1944 |
| 2,362,444 | Blanchard et al. | Nov. 14, 1944 |
| 2,396,911 | Anxionnaz | Mar. 19, 1946 |
| 2,399,046 | Larrecq | Apr. 23, 1946 |
| 2,404,767 | Heppner | July 23, 1946 |
| 2,409,446 | Pavlecka et al. | Oct. 15, 1946 |
| 2,421,514 | Martin | June 3, 1947 |
| 2,455,378 | McCoy | Dec. 7, 1948 |
| 2,477,798 | Griffith | Aug. 2, 1949 |
| 2,514,513 | Price | July 11, 1950 |

FOREIGN PATENTS

| Number | Country | Date |
|---|---|---|
| 91,848 | Sweden | Mar. 26, 1938 |
| 495,469 | Great Britain | Feb. 8, 1937 |